(12) United States Patent
Bastholm et al.

(10) Patent No.: US 7,137,489 B2
(45) Date of Patent: Nov. 21, 2006

(54) ACTUATOR

(75) Inventors: Jeppe Christian Bastholm, Sønderborg (DK); Karsten Westermann, Sønderborg (DK)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 10/528,484

(22) PCT Filed: Sep. 22, 2003

(86) PCT No.: PCT/DK03/00611

§ 371 (c)(1),
(2), (4) Date: Apr. 20, 2005

(87) PCT Pub. No.: WO2004/027290

PCT Pub. Date: Apr. 1, 2004

(65) Prior Publication Data

US 2005/0173209 A1   Aug. 11, 2005

(30) Foreign Application Priority Data

Sep. 22, 2002   (EP)   .................................. 02078970

(51) Int. Cl.
*F16D 65/36* (2006.01)
(52) U.S. Cl. .................. 188/156; 188/162; 188/171
(58) Field of Classification Search ................ 188/265, 188/67, 156, 157, 158, 162, 171
See application file for complete search history.

(56) References Cited

U.S. PATENT DOCUMENTS

| 4,246,991 A | 1/1981 | Oldakowski |
| 6,459,182 B1 * | 10/2002 | Pfann et al. .................. 310/77 |

FOREIGN PATENT DOCUMENTS

| DE | 296 06 367 | 9/1996 |
| EP | 0 662 573 | 7/1995 |
| EP | 0662573 | * 7/1995 |

* cited by examiner

*Primary Examiner*—Devon Kramer
(74) *Attorney, Agent, or Firm*—Dykema Gossett PLLC

(57) ABSTRACT

An actuator, preferably a linear actuator for furniture, comprises a brake spring (20) in the form of a helical spring having a plurality of windings wound around a cylindrical element (10) of plastics rotatable at least during braking, said spring being tightened around the cylindrical element for braking. The frictional heat generated hereby can cause the plastics to be deformed, which adversely affects the braking power. This is solved by providing the cylindrical element (10) consisting of plastics with an insert (12) of metal for carrying off the frictional heat preferably into other metal parts of the actuator that may serve as cooling faces. To carry off heat additionally, it is proposed to arrange a second heat-conducting element (18) in intimate contact with the outer side of the spring (20), said element being likewise connected with other metal parts of the actuator that may serve as cooling faces.

6 Claims, 2 Drawing Sheets

ACTUATOR

BACKGROUND OF THE INVENTION

The present invention relates to an actuator, preferably for furniture, and comprising a holding brake spring in the form of a helical spring having a plurality of windings around a cylindrical element of plastics rotatable at least during braking, the spring being tightened around the cylindrical element for braking.

THE PRIOR ART

EP 662 573 B1 discloses a linear actuator of the type mentioned above. To illustrate the background of the invention, reference is made to the embodiment shown in FIG. 2 of the EP document. The shown actuator is driven by an electric motor which drives a spindle via a worm drive. The spindle has positioned thereon a nut to which an extension rod is secured. The worm is formed in extension of the motor shaft and is of steel. On the side of the worm wheel there is provided, as an integrated part of it, a cylindrical element around which a brake spring is positioned whose one end is fixed to the motor housing. The spindle and the worm wheel are interconnected by a splined connection, of which one part is provided in a cavity in the cylindrical element, while the other part is an element on the end of the spindle. For a low level of noise and small wear on the worm as well as for reasons of costs, the worm wheel is moulded in plastics.

During braking, the kinetic energy of the spindle is converted into frictional heat in the spring and the cylindrical element. The generation of heat can be rather violent with a consequent risk of deformation of the plastics material, which adversely affects the braking effect. It might then be contemplated to make worm wheels of metal, but this involves unacceptable transmission noise, just as the degree and the uniformity of the braking are impeded. Another possibility is then to use a plastics material having better heat-resistant properties, such as fibreglass-reinforced plastics, but these involve an unacceptably great wear on the worm. Air and liquid cooling are excluded in advance, partly because of costs, and partly because of insufficient space in the actuator.

SUMMARY OF THE INVENTION

According to this invention the problem is solved by providing the plastic cylindrical element with an insert of metal for carrying off the frictional heat generated during the braking. Hereby it is possible still to use the plastics material with the advantages involved by this, while the heat problems of the plastics can be avoided in a relatively simple way. The metal insert may be positioned right under the spring, i.e., precisely where the heat is generated, and the plastics layer between insert and spring may be made very thin so that the heat is conducted directly to the insert. The plastics may be moulded directly on the metal insert, and various steps may be taken, such as knurling of, recesses in, bosses on the surface of the insert, etc., to ensure the transfer of the forces occurring.

The effect of the carrying-off of the heat may be increased by causing the insert to contact cooling faces of metal, preferably other actuator parts consisting of metal, such as a metal frame, a motor housing, a spindle, etc.

In an embodiment of a linear actuator where the connection between worm wheel and spindle is formed by a spline, the insert is formed with the spline so that there is direct contact between insert and spindle. The heat is thus carried off through the spindle via the insert.

In a further development of the invention the heat is carried off through a further element (collar) in intimate contact with the outer side of the spring, the element being made of a more heat-conducting material than the spring. It will be appreciated that the element must not interfere with the function of the spring, of course.

In an embodiment for optimum carrying-off of heat, the element covers the entire or substantially the entire outer side of the spring.

Here, too, the cooling effect may be increased by causing the element to contact cooling faces, preferably other actuator parts consisting of metal.

BRIEF DESCRIPTION OF THE DRAWINGS

An embodiment of the invention will be explained more fully below with reference to the accompanying drawing. In the drawings.

DETAILED DESCRIPTION OF THE PREFERRED EMBODIMENT

Figure 1:
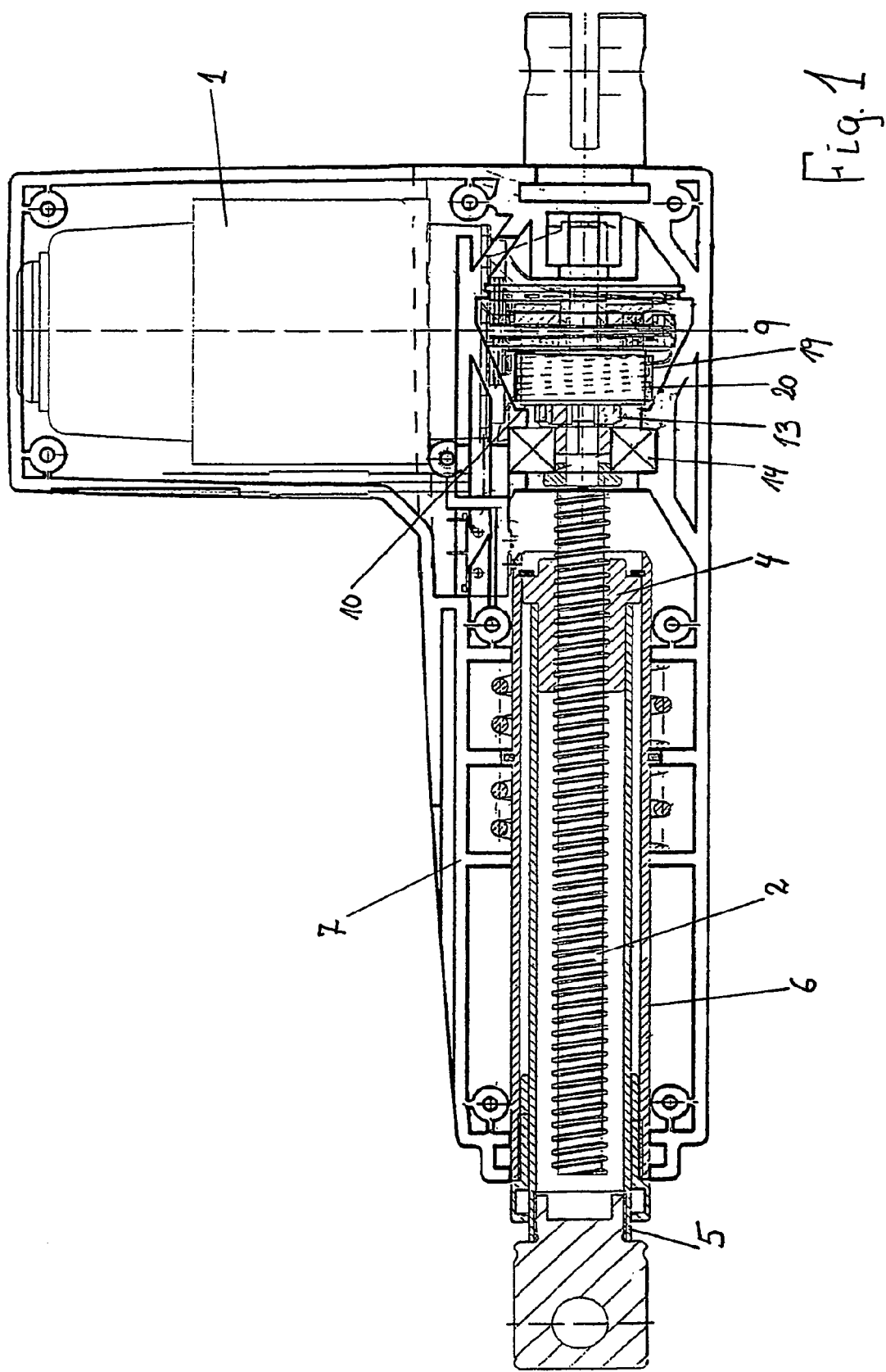
FIG. 1 shows a longitudinal section through a linear actuator according to the invention.
Figure 2:
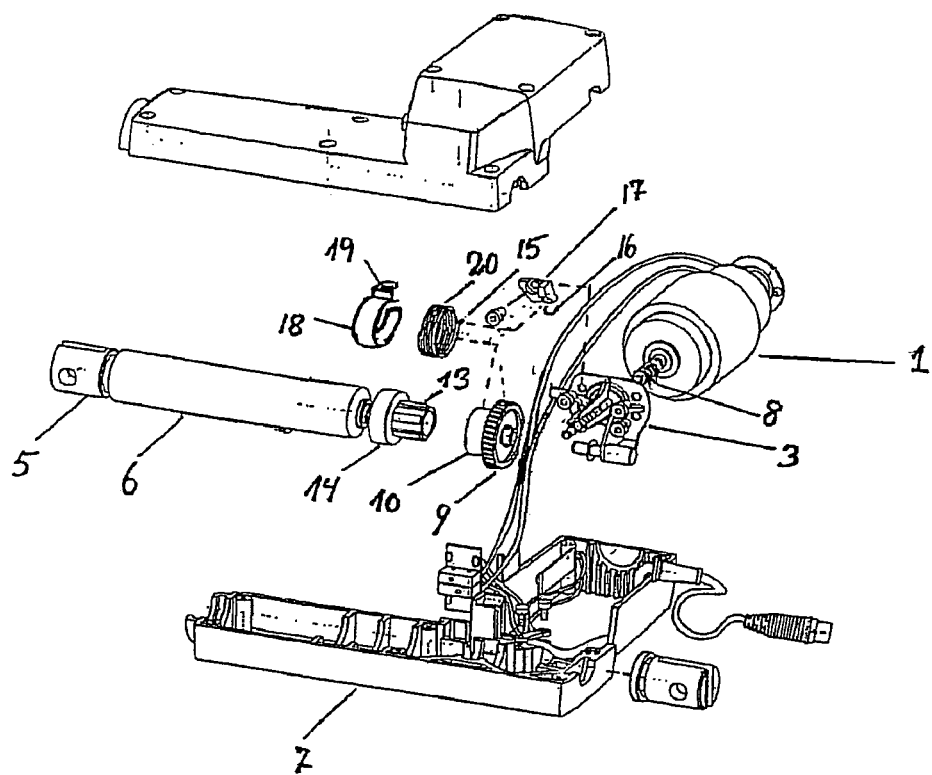
FIG. 2 shows an exploded view of the actuator in FIG. 1.
Figure 3:
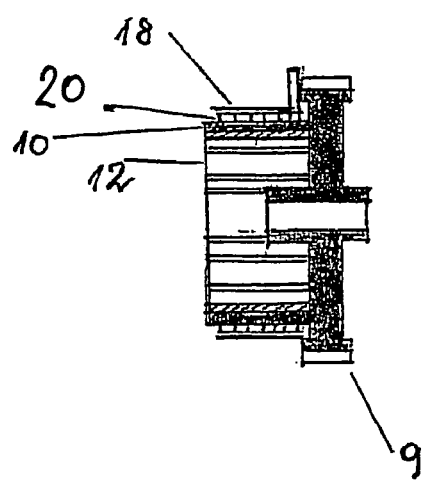
FIG. 3 shows a perspective view of the worm wheel on an enlarged scale.

The linear actuator shown in the drawing comprises a reversible low volt electric motor (DC) 1, which drives a spindle 2 via a worm drive. The numeral 3 designates a front member for the motor. A nut 4 is provided on the spindle and has secured thereto a drive rod 5 in the form of a pipe telescopically arranged in an outer pipe 6, which is embedded in the housing 7 of the actuator.

The worm drive comprises a worm 8 formed in extension of the motor shaft, which is of steel, as well as a worm wheel 9 with a cylindrical element 10 which is integrated on the side, and which accommodates an insert 12. The worm wheel is of plastics (POM), fixedly moulded on the insert which is of lightweight metal (aluzinc).

The worm wheel 9 is secured to the spindle by a splined connection, where one part is formed in the insert 12, and the other part is formed by an element 13 secured on the end of the spindle. The spindle is mounted in a bearing 14 in front of the worm wheel.

On the cylindrical element there is a brake spring in the form of a helical spring 20 having one end fixed. For this purpose, the end 15 of the spring is bent outwards and is received in a hole 16 in an element 17, which is secured by a screw to the motor housing. A heat conducting element collar 18 of copper is provided externally on the spring in intimate contact with it, and is secured with the end via an eye 19 to the motor housing via the element 17, there being provided a pin here for hooking-on the element.

The windings of the spring extend around the cylindrical element 10 such that the spring does not counteract the spindle in the direction of rotation when the drive rod 5 is extended, but when the direction of rotation is reversed for reversal of the drive rod, the spring affects the cylindrical element with a braking force. When the drive rod is extended, the direction of rotation of the spindle causes the spring, which is tightly engaged with the cylindrical element, to open figuratively speaking, as the friction from the cylindrical element acts against the winding direction of the spring, and thereby the spring does not, or only to an insignificant extent, affect the rotation of the spindle. During reversal, on the other hand, the spring will be tightened around the cylindrical element and exert a braking or rather holding force on the cylindrical element and thereby on the spindle. A non-self-locking spindle may thus be made self-locking, just as the self-locking ability of a self-locking spindle may be increased, cf. EP 662 572 B1.

Part of the frictional heat, which is generated by holding the spindle, is transferred into the insert and via the splined connection into the spindle, just as part of the heat is transferred into the shield and from there into the motor housing. The insert and the spindle as well as the heat-conducting element and the motor housing thereby serve as cooling faces for the holding brake and thereby prevent the plastics from being superheated, thereby avoiding heat deformations of the plastics.

With the measures stated here, it has been shown that it is possible to lower the temperature in the brake from about 160° C. to about 80° C., which is sufficient to prevent the plastics material (POM) from being heat-deformed.

The electrical equipment with end stop, control electronics, operating panel and power supply is not described, because this is generally known.

Described here is a linear actuator which is subjected to a compressive load. In case of linear actuators which are affected by tensile loads, the winding direction of the brake spring must be reversed of course.

It will be appreciated that the invention may also be applied where the brake is not mounted directly in the transmission from the motor to the actuation element, but is placed laterally thereof.

The invention claimed is:

1. An actuator comprising a spindle, a worm wheel connected to the spindle by a spline, a plastic cylindrical element which is rotatable at least during reversed movement, a helical spring having a plurality of windings around the plastic cylindrical element for tightening around the cylindrical element during reversed movement, and a metal insert inside the cylindrical element for carrying off frictional heat generated during the reversed movement, the metal insert being connected to cooling faces of metal and the spline being formed in the insert so that there is direct contact between the insert and the spindle.

2. An actuator according to claim 1, including a collar in intimate contact with an outer side of the spring for carrying off heat, said collar being made of a more heat-conducting material than the spring.

3. An actuator according to claim 2, wherein the collar essentially covers the entire outer side of the spring.

4. An actuator according to claim 3, wherein the collar is connected with metallic cooling faces.

5. An actuator comprising a helical spring having a plurality of windings around a plastic cylindrical element which is rotatable at least during reversed movement, said helical spring being tightened around the cylindrical element during reversed movement, a metal insert inside the cylindrical element for carrying off frictional heat generated during the reversed movement, and a collar in intimate contact with an outer side of the spring for carrying off heat, said collar being made of a more heat-conducting material than the spring.

6. An actuator according to claim 5, wherein the collar essentially covers the entire outer side of the spring.

* * * * *